United States Patent
Luo et al.

(10) Patent No.: US 7,942,964 B2
(45) Date of Patent: *May 17, 2011

(54) FIBER CEMENT COMPOSITE MATERIALS USING BLEACHED CELLULOSE FIBERS

(75) Inventors: Caidian Luo, Alta Loma, CA (US); Donald J. Merkley, Alta Loma, CA (US)

(73) Assignee: James Hardie Technology Limited

( * ) Notice: Subject to any disclaimer, the term of this patent is extended or adjusted under 35 U.S.C. 154(b) by 0 days.

This patent is subject to a terminal disclaimer.

(21) Appl. No.: 10/753,089

(22) Filed: Jan. 7, 2004

(65) Prior Publication Data

US 2004/0168615 A1    Sep. 2, 2004

Related U.S. Application Data

(60) Provisional application No. 60/439,040, filed on Jan. 9, 2003.

(51) Int. Cl.
*C04B 16/06* (2006.01)
(52) U.S. Cl. ........ 106/713; 106/644; 106/711; 106/724; 106/726; 106/731; 428/296
(58) Field of Classification Search .................. 106/644, 106/711, 724, 726, 731; 428/296
See application file for complete search history.

(56) References Cited

U.S. PATENT DOCUMENTS

| | | | |
|---|---|---|---|
| 1,571,048 | A | 1/1926 | Garrow |
| 1,914,163 | A | 6/1933 | Randall |
| 2,024,689 | A | 12/1935 | Walter et al. |
| 2,030,383 | A | 2/1936 | Luth et al. |
| 2,054,854 | A | 9/1936 | Dreyfus |
| 2,156,308 | A | 5/1939 | Schuh |
| 2,156,311 | A | 5/1939 | Schuh |
| 2,175,568 | A | 10/1939 | Haustein |
| 2,175,569 | A | 10/1939 | Kennedy |
| 2,176,668 | A | 10/1939 | Housfoin |
| 2,377,484 | A | 6/1945 | Elmendorf |
| 2,645,576 | A | 7/1953 | Bate et al. |
| 2,880,101 | A | 3/1959 | Ulfstedt |
| 3,264,125 | A | 8/1966 | Bourlin |
| 3,716,386 | A | 2/1973 | Kempster |
| 3,748,100 | A | 7/1973 | Forseth |

(Continued)

FOREIGN PATENT DOCUMENTS

AR    015457 A1    9/1998

(Continued)

OTHER PUBLICATIONS

"Slow crack growth in bleached cellulose fiber", Mai et al., Journal of Materials Science Letters (1984), 3(2), p. 127-130.*

(Continued)

*Primary Examiner* — Paul Marcantoni
(74) *Attorney, Agent, or Firm* — Gardere Wynne Sewell, LLP

(57) ABSTRACT

A fiber cement composite material that incorporates a blend of bleached and unbleached cellulose fibers as a partial or complete substitute for premium grade cellulose pulp is provided. Bleached standard grade cellulose fibers are used in conjunction with unbleached, standard grade cellulose fibers to provide a fiber cement composite product having substantially equal or even superior flexibility and strength as an equivalent fiber cement composite material reinforced by premium grade, unbleached cellulose fibers. A synergistic combination of bleached and unbleached standard grade cellulose fibers to produce a composite material with the desired properties previously achievable only through the use of premium grade cellulose pulp.

14 Claims, 4 Drawing Sheets

MOR of Fiber-Cement Composite Specimens Made with Varying Doses of Bleached Kraft Fibers in Fiber Blends

U.S. PATENT DOCUMENTS

| | | |
|---|---|---|
| 3,748,160 A | 7/1973 | Carbajal |
| 3,753,749 A | 8/1973 | Nutt |
| 3,836,412 A | 9/1974 | Boustany |
| 3,843,380 A | 10/1974 | Beyn |
| 3,865,779 A | 2/1975 | Oya et al. |
| 3,918,981 A | 11/1975 | Long |
| 3,931,069 A | 1/1976 | Lundin |
| 3,969,567 A | 7/1976 | Occleshaw et al. |
| 3,998,944 A | 12/1976 | Long |
| 4,003,752 A | 1/1977 | Isohata et al. |
| 4,013,480 A | 3/1977 | Chumbley et al. |
| 4,088,804 A | 5/1978 | Cornwell et al. |
| 4,098,701 A | 7/1978 | Burrill et al. |
| 4,102,697 A | 7/1978 | Fukuba et al. |
| 4,138,313 A | 2/1979 | Hillstrom et al. |
| 4,177,176 A | 12/1979 | Burrill et al. |
| 4,225,383 A | 9/1980 | McReynolds |
| 4,258,090 A | 3/1981 | Moraru |
| 4,274,913 A | 6/1981 | Kikuiri et al. |
| 4,306,911 A | 12/1981 | Gordon et al. |
| 4,351,867 A | 9/1982 | Mulvey et al. |
| 4,406,703 A | 9/1983 | Guthrie et al. |
| 4,428,775 A | 1/1984 | Johnson et al. |
| 4,457,785 A | 7/1984 | Hsu et al. |
| 4,497,688 A | 2/1985 | Schaefer |
| 4,510,020 A | 4/1985 | Green et al. |
| 4,517,375 A | 5/1985 | Schmidt |
| 4,548,676 A | 10/1985 | Johnstone et al. |
| 4,637,860 A | 1/1987 | Harper et al. |
| 4,643,920 A | 2/1987 | McEntee et al. |
| 4,647,505 A | 3/1987 | Blackie et al. |
| 4,647,509 A | 3/1987 | Wallace et al. |
| 4,647,589 A | 3/1987 | Valone |
| 4,655,979 A | 4/1987 | Nakano et al. |
| 4,659,386 A | 4/1987 | Nagai et al. |
| 4,738,723 A | 4/1988 | Frizzell et al. |
| 4,766,113 A | 8/1988 | West et al. |
| 4,806,203 A | 2/1989 | Elton |
| 4,938,958 A | 7/1990 | Niira et al. |
| 4,944,842 A | 7/1990 | Stromberg et al. |
| 4,971,658 A | 11/1990 | Henrickson et al. |
| 4,985,119 A | 1/1991 | Vinson et al. |
| 5,021,093 A | 6/1991 | Beshay |
| 5,030,289 A | 7/1991 | Sattler et al. |
| 5,047,086 A | 9/1991 | Hayakawa et al. |
| 5,049,196 A | 9/1991 | Ries |
| 5,063,260 A | 11/1991 | Chen et al. |
| 5,102,596 A | 4/1992 | Lempfer et al. |
| 5,118,225 A | 6/1992 | Koch et al. |
| 5,191,456 A | 3/1993 | Sutherland et al. |
| 5,223,090 A | 6/1993 | Klungness et al. |
| 5,236,994 A | 8/1993 | Markusch et al. |
| 5,346,541 A | 9/1994 | Goldman et al. |
| 5,403,392 A | 4/1995 | Craig |
| 5,405,498 A | 4/1995 | Pease |
| 5,415,734 A | 5/1995 | Backlund et al. |
| 5,421,867 A | 6/1995 | Yeager et al. |
| 5,429,717 A | 7/1995 | Bokstrom et al. |
| 5,432,215 A | 7/1995 | Girg et al. |
| 5,465,547 A | 11/1995 | Jakel |
| 5,472,486 A | 12/1995 | Dragner et al. |
| 5,520,779 A | 5/1996 | Bold |
| 5,577,024 A | 11/1996 | Malkamaki et al. |
| RE35,460 E | 2/1997 | Klungness et al. |
| 5,643,359 A | 7/1997 | Souroushian et al. |
| 5,705,542 A | 1/1998 | Roffael et al. |
| 5,777,024 A | 7/1998 | Killilea et al. |
| 5,786,282 A | 7/1998 | Carter et al. |
| 5,795,515 A | 8/1998 | Fischer |
| 5,804,003 A | 9/1998 | Nishizawa |
| 5,866,057 A | 2/1999 | Roffael |
| 5,871,824 A | 2/1999 | Bates |
| 5,876,561 A | 3/1999 | Tsai |
| 5,897,701 A | 4/1999 | Soroushian et al. |
| 5,945,044 A | 8/1999 | Kawai et al. |
| 5,989,335 A | 11/1999 | Soroushian et al. |
| 6,030,447 A | 2/2000 | Naji et al. |
| 6,045,057 A | 4/2000 | Moor et al. |
| 6,086,998 A | 7/2000 | Wihsmann |
| 6,138,430 A | 10/2000 | Van Acoleyen et al. |
| 6,176,920 B1 | 1/2001 | Murphy et al. |
| 6,228,215 B1 | 5/2001 | Hoffman, Jr. |
| 6,245,196 B1 | 6/2001 | Martin et al. |
| 6,325,853 B1 | 12/2001 | Hogan et al. |
| 6,344,654 B1 | 2/2002 | Lesko |
| 6,346,146 B1 * | 2/2002 | Duselis et al. ............... 106/713 |
| 6,346,165 B1 | 2/2002 | Markessini et al. |
| 6,352,952 B1 | 3/2002 | Jardine et al. |
| 6,419,788 B1 | 7/2002 | Wingerson |
| 6,475,275 B1 | 11/2002 | Nebesnak et al. |
| 6,488,762 B1 | 12/2002 | Shi |
| 6,506,248 B1 * | 1/2003 | Duselis et al. ............... 106/713 |
| 6,512,132 B2 | 1/2003 | Isoda et al. |
| 6,528,151 B1 | 3/2003 | Shah et al. |
| 6,562,743 B1 | 5/2003 | Cook et al. |
| 6,572,697 B2 | 6/2003 | Gleeson et al. |
| 6,613,424 B1 | 9/2003 | Putt et al. |
| 6,676,744 B2 | 1/2004 | Merkley et al. |
| 6,676,745 B2 | 1/2004 | Merkley et al. |
| 6,719,878 B1 | 4/2004 | Svedman |
| 6,749,897 B2 | 6/2004 | Naji et al. |
| 6,770,576 B2 | 8/2004 | Cook et al. |
| 6,777,103 B2 | 8/2004 | Merkley et al. |
| 6,837,452 B2 * | 1/2005 | Dezutter et al. ............... 241/16 |
| 6,872,246 B2 | 3/2005 | Merkley et al. |
| 6,893,751 B2 | 5/2005 | Naji et al. |
| 6,933,038 B2 | 8/2005 | Nanko et al. |
| 6,942,726 B2 * | 9/2005 | Cook et al. ..................... 106/644 |
| 7,028,436 B2 | 4/2006 | Bezubic, Jr. |
| 7,081,184 B2 | 7/2006 | Wester et al. |
| 7,226,525 B2 | 6/2007 | Vrbanac et al. |
| 7,300,546 B2 | 11/2007 | Jewell et al. |
| 7,344,593 B2 | 3/2008 | Luo et al. |
| 7,455,727 B2 | 11/2008 | Trevethick |
| 2002/0007926 A1 | 1/2002 | Jewell et al. |
| 2002/0007927 A1 | 1/2002 | Vahatalo et al. |
| 2002/0051892 A1 | 5/2002 | Laks et al. |
| 2002/0059886 A1 | 5/2002 | Merkley et al. |
| 2002/0069791 A1 | 6/2002 | Merkley et al. |
| 2002/0088584 A1 | 7/2002 | Merkley et al. |
| 2002/0112827 A1 | 8/2002 | Merkley et al. |
| 2002/0121229 A1 | 9/2002 | Jardine et al. |
| 2002/0170466 A1 | 11/2002 | Naji et al. |
| 2002/0170467 A1 | 11/2002 | Naji et al. |
| 2002/0170468 A1 | 11/2002 | Luo et al. |
| 2002/0175126 A1 | 11/2002 | Naji et al. |
| 2002/0179219 A1 | 12/2002 | Naji et al. |
| 2002/0189499 A1 | 12/2002 | Naji et al. |
| 2002/0189500 A1 | 12/2002 | Naji et al. |
| 2002/0192510 A1 | 12/2002 | Naji et al. |
| 2003/0000424 A1 | 1/2003 | Naji et al. |
| 2003/0164119 A1 | 9/2003 | Naji et al. |
| 2003/0213568 A1 | 11/2003 | Wester et al. |
| 2003/0213569 A1 | 11/2003 | Wester et al. |
| 2003/0213570 A1 | 11/2003 | Vrbanac et al. |
| 2003/0213572 A1 | 11/2003 | Vrbanac et al. |
| 2004/0043217 A1 * | 3/2004 | Dezutter et al. ............... 428/407 |
| 2004/0043686 A1 | 3/2004 | Batdorf |
| 2004/0132843 A1 | 7/2004 | Baumgart |
| 2004/0145078 A1 | 7/2004 | Merkley et al. |
| 2004/0168615 A1 | 9/2004 | Luo |
| 2005/0016423 A1 | 1/2005 | Merkley et al. |
| 2005/0045067 A1 | 3/2005 | Naji et al. |
| 2005/0126430 A1 | 6/2005 | Lightner et al. |
| 2005/0208287 A1 | 9/2005 | Naji et al. |
| 2005/0235883 A1 | 10/2005 | Merkley et al. |
| 2007/0077436 A1 | 4/2007 | Naji et al. |

FOREIGN PATENT DOCUMENTS

| | | |
|---|---|---|
| AR | 014046 A1 | 11/1998 |
| AR | 014702 A1 | 3/1999 |
| AT | 391131 B | 8/1990 |
| AU | B1-60 655/80 | 3/1981 |
| AU | 2002240552 B2 | 9/2002 |
| CA | 1177205 | 11/1984 |
| CA | 2242749 | 2/1999 |
| CA | 2405354 | 11/2001 |

| | | |
|---|---:|---|
| CL | 32972 | 2/1980 |
| CL | 2346-01 | 9/2001 |
| CL | 2347-01 | 9/2001 |
| CL | 2352-01 | 9/2001 |
| CL | 2353-01 | 9/2001 |
| CL | 461-02 | 3/2002 |
| CN | 1032332 | 4/1989 |
| CN | 1199116 | 11/1998 |
| CN | 1224701 A | 8/1999 |
| DE | 3037220 | 4/1982 |
| DE | 3308917 | 9/1984 |
| DE | 3601736 A1 | 1/1986 |
| DE | 4316666 C1 | 12/1994 |
| DE | 19654836 | 6/1998 |
| EP | 0049365 | 4/1982 |
| EP | 0056263 A1 | 7/1982 |
| EP | 0287962 | 4/1987 |
| EP | 263723 * | 4/1988 |
| EP | 0263723 * | 4/1988 |
| EP | 0305209 | 3/1989 |
| EP | 0 263 723 B1 | 2/1991 |
| EP | 484283 | 6/1992 |
| EP | 0147429 A1 | 7/1995 |
| EP | 1088800 A | 4/2000 |
| EP | 1052262 | 11/2000 |
| EP | 1106236 A1 | 6/2001 |
| EP | 1155794 | 11/2001 |
| EP | 1346964 A2 | 9/2003 |
| EP | 1334076 B1 | 8/2006 |
| ES | 2033987 | 4/1993 |
| FR | 895184 | 1/1945 |
| FR | 1557348 | 2/1969 |
| FR | 2611432 | 9/1988 |
| GB | 22139 | 11/1901 |
| GB | 442098 | 2/1936 |
| GB | 449384 | 6/1936 |
| GB | 731597 | 6/1955 |
| GB | 1003850 | 8/1963 |
| GB | 1536663 | 12/1978 |
| GB | 2041384 | 9/1980 |
| GB | 1604910 | 12/1981 |
| GB | 2137977 | 10/1984 |
| GB | 2307425 A | 5/1997 |
| JP | 55085756 | 6/1980 |
| JP | 203747/84 | 11/1984 |
| JP | 61019900 | 1/1986 |
| JP | 63107849 A | 5/1988 |
| JP | 01141849 | 6/1989 |
| JP | 03016978 | 1/1991 |
| JP | 06024821 | 8/1991 |
| JP | 0418233 | 6/1992 |
| JP | 04182335 | 6/1992 |
| JP | 04342746 | 11/1992 |
| JP | 5-177625 A2 | 7/1993 |
| JP | 05184246 | 7/1993 |
| JP | 06144911 | 5/1994 |
| JP | 341093/94 | 12/1994 |
| JP | 07041592 | 2/1995 |
| JP | 07109165 A | 4/1995 |
| JP | 08 119708 | 5/1996 |
| JP | 2508554 B2 | 6/1996 |
| JP | 10095922 | 4/1998 |
| JP | 11-010631 | 1/1999 |
| JP | 11099512 | 4/1999 |
| JP | 2001 240458 | 9/2001 |
| JP | 2001316163 | 11/2001 |
| JP | 2003335560 | 11/2003 |
| KR | 1019950008587 B1 | 8/1995 |
| PL | 154782 | 12/1991 |
| SU | 240472 | 3/1969 |
| WO | WO 84/04765 | 12/1984 |
| WO | WO 91/01409 | 2/1991 |
| WO | WO-9520066 | 7/1995 |
| WO | WO 96/17996 | 6/1996 |
| WO | 9708111 | 3/1997 |
| WO | WO 97/31153 A1 | 8/1997 |
| WO | WO 98/18855 | 5/1998 |
| WO | WO 98/27027 | 6/1998 |
| WO | WO-9845222 | 10/1998 |
| WO | 9935330 | 7/1999 |
| WO | WO 00/71336 A1 | 11/2000 |
| WO | 0130927 | 5/2001 |
| WO | WO 01/68547 | 9/2001 |
| WO | WO 01/81666 A2 | 11/2001 |
| WO | WO 02/12623 A1 | 2/2002 |
| WO | WO 02/18486 A2 | 3/2002 |
| WO | WO 02/28795 | 4/2002 |
| WO | WO 02/28796 A2 | 4/2002 |
| WO | WO 02/33164 | 4/2002 |
| WO | WO 02/070425 | 9/2002 |
| WO | WO 02/072499 A2 | 9/2002 |
| WO | WO 2004/063113 | 7/2004 |

OTHER PUBLICATIONS

"Effects of water and bleaching pn the mechanical properties of cellulose fiber cements" Mai et al., Journal of Materials Science (1983), 18(7), 2156-62.*

"Slow crack growth in Bleached cellulose fibre cements" Mai et al., Journal of Mat'ls Science Letters 3 (1984), 127-130.*

"Effects of water and blecahing on the mechanical properties of cellulose fiber cements" Mai et al., Journal of Materials Science 18 (1983) 2156-62.*

Technical File by Louisiana-Pacific Samao, Inc. sent to Redco on May 5, 1999.

Declaration by a Representative of the company (Bill Adams), Weyerhauser, and bills dated prior to Oct. 17, 1999.

M.D. Campbell and R.S.P. Coutts, Wood fibre-reinforced cement composites, in Journal of Materials Science, 15 (1980), pp. 1962-1970.

R.S.P. Coutts, "From forest to factory to fabrication," in Fibre Reinforced Cement and Concrete, 1992, ed. R.N. Swamy, E & FN SPON, London, pp. 31 to 47.

Extract from Webster's Third New International Dictionary of the English Language unabridged, ed Merriam-Webster Inc., Springfield, 1986.

Woods, Amy Lamb "Keeping a Lid on It: Asbestos-Cement Building materials" Aug. 2000 (12 pgs) internet article located at: www.cr.nps.gov/hps/tps/recentpast/asbestosarticle.htm.

Chapter 5 "Asbestos Cement Products" pp. 25-40 (book unknown).

Chemical Abstracts on STN "Plasticizing effect of aliphatic amines on cements" Babachev et al, Build Sci Inst. Sofia Bulgaria; Epitoanyag (1972), 24(11), 430-5; Abstract Only.

Hawley's Condensed Chemical Dictionary, Richard Lewis Sr., Twelfth Edition, 1993 Van Nostrand Reinhold, p. 435 definition of "dispersing agent."

A.D. Shapiro et al., Bumazhnaya Promyshiennost 36, 12 (1961) XP-002335287 "manufacture of board resistant to biological degradation".

Finnish Forest Industries Federal "Mechanical Pulp Production" internet article located at http://english.forestindustries.fi/products/pulp/mechanical.html dated Nov. 10, 2004 (2 pgs).

Ekman et al., "Studies on the Behavior of Extractives in Mechanical Pulp Suspensions," the Institute of Paper Science and Technology; Jun. 1990.

XP002194276 (Abstract Bulletin) Ekman et al., "Studies on the Behavior of Extractives in Mechanical Pulp Suspensions" Nordic Pulp Paper Res. J.2, No. 5; 96-102 (Jun. 1990).

JUBOCID "Special Anti-Mildew Coatings" Sep. 2002 (4 pgs).

Improvements in the Durability of Cellulose Reinforced Cementitious Composites, Lin et al. Mechanisms of Chemical Degradation of Cement based systems, Proceedings of the Materials Research Society's Symposium of Mechanisms, Boston, Nov. 27-30, 1995.

Thai MDF Board Co., Ltd "Beger Synotex Acrylic TM 100% Emulsion Paint" (2 pgs) 2003 article located at: http://www.thaimdf.com/paint_roofpaint.htm.

"Hardi-Plank and Surface Mold" article located at internet http://www.nefsi.org/wwwboard/messages/439.html (2 pgs).

FORCE 10 Caribbean "Custom Features" Engineered Building Systems (5 pgs) 1999.

Third Party Observation filed by Redco NV in the EPO application for .071VEP (129843.2354) filed on Aug. 23, 2006.

XP002197953 & JP 2001 240458 A, Kamishima Kagaku Kogyo KK) Database WPI, Section Ch, Week 200212, Derwent Publications Ltd., London, GB; AN 2002-085436, Sep. 4, 2001 abstract.

Opposition to EP-B-1330571 (Our Ref.#129843.2117) filed by Redco on Dec. 15, 2006, but mailed by EP Patent Office on Dec. 28, 2006.

Opposition to EP-B-1330571 (Our Ref.#129843.2117) filed by St. Gobain Materiaux dated Jan. 19, 2007 but mailed by EP Pat.Office on Feb. 1, 2007.

U.S. Appl. No. 10/070,218, unpublished, James Hardie.

Chemical Abstracts, vol. 94, No. 8, Feb. 23, 1981; Columbus, Ohio, U.S.; Abstract No. 51915a; "Building Materials with Improved Black Mold Resistance".

Chemical Abstracts. vol. 104, No. 14, Apr. 7, 1986; Columbus, Ohio, U.S.; Abstract No. 114971p; "Lightweight Cement Moldings".

International Search Report for PCT/AU03/01315 dated Nov. 12, 2003 (1882369).

Final office action mailed Jan. 16, 2008 in U.S. Appl. No. 10/753,089 (2004/0168615).

Response to final office action filed Oct. 31, 2007 in relation to U.S. Appl. No. 10/753,089 (2004/0168615).

Information Disclosure Statement filed Sep. 28, 2007 and Oct. 29, 2007 and initialed by Examiner in U.S. Appl. 10/753,089 (2004/0168615).

"Forming Handsheets for Physical Tests of Pulp," TAPPI, T 205 sp-95, 1995 pp. 5-7.

Harper, S., and M. Grenggs, "Resin Extraction and Effects on Pulp Quality," Proceedings of the 54th Appita Annual Conference, Melbourne, Apr. 3-6, 2000, pp. 575-580.

Stromberg, C.B., "Washing for Low Bleach Chemical Consumption," in Thomas W. Joyce (ed.), Environmental Issues: A TAPPI Press Anthology of Published Papers, TAPPI Press, Atlanta, 1990 pp. 230-238.

Stromberg, C.B., Washing Of Dissolved Organic Solids From Pulp, Paper Asia, Oct. 1994, pp. 32-39.

Scandinavian Pulp, Paper and Board Testing Committee, "COD and TOC Removable by Washing," SCAN-C 45:00, 2000, pp. 1-5.

Scandinavian Pulp, Paper and Board Testing Committee, "Water-Soluble Organic Matter," SCAN-CM 45:91, 1991, pp. 1-4.

The Trial of Antisepsis and Mothproof on Rural Timber Structure Architectures, Ming Zhou, China Wood Industry, Issue 2 of 1987, pp. 16-24.

International Search Report for PCT/AU03/01315 dated Nov. 12, 2003.

International Search Report for Wo 02/028796 A2.

Chilean Patent Application No. 2346-2001 (129843.2136).

Chilean Patent Application No. 2353-2001 (James Hardie, Oct. 4, 2000).

Chilean Patent Application No. 2352-2001 (James Hardie / 129843.2094).

International Search Report for PCT/US05/007581.

International Preliminary Report on Patentability for PCT/US2005/007581 dated Jun. 19, 2007.

Letter to European Patent Office from Opponent REDCO dated Aug. 1, 2008 (14 pgs., including translation).

Documents from the Examination Procedure of European Patent Application No. 05075809.3, submitted to European Patent Office on Aug. 1, 2008 by Opponent REDCO.

Locher, Friedrich W. "Fundamentals of Production and Application" VBT; 2000 (w/translation).

"Effect of the Extraction Temperature upon the COD value of a Cellulose Pulp" (date unknown) (author unknown) (1 pg) (w/translation).

"Pre-extraction of hemicelluloses and subsequent kraft pulping Part I: alkaline extraction" article from TAPPI Journal (Jun. 2008) (6 pgs).

Letter to European Patent Office from Opponent Saint Gobain dated Aug. 1, 2008 (3 pgs., including translation).

Berry, Craig, "Determination of the Influence of Pulp Chemical Oxygen Demand on the Flexural Strength of Cured Fibercement" (11 pgs) (date unknown).

Expert Declaration of Prof. Dr. Dahl, with CV (Jan. 28, 2009).

Expert Declaration of Prof. Dr. Roffael (Jan. 28, 2009).

MacDougall, F.H., Excerpt "Reactions in Heterogeneous Systems" Thermodynamics and Chemistry (1921), title page and p. 64.

Elastomeric Wall Coatings website article located at http://wwvv.energy-seal.com/es-home.nsf/products/everlast (undated), 2 pgs.

"Moisture in Pulp, Paper and Paperboard," TAPPI, T 412 om-94, (1994) pp. 1-3.

Rozman et al., "Improvements of Fibreboard Properties through Fibre Activation with Silane" J. Polymeric Mater., vol. 32 (1996) pp. 247-257.

Written Opinion for WO 02/028796 A2 (PCT/US01/42243) dated Feb. 4, 2003.

Neithalath, Narayanan, Weiss, Jason, and Olek Jan, *Acoustic Performance and Damping Behavior of Cellulose-Cement Composites*, Cement & Concrete Composites 25 (2003).

Soroushian, Parviz, *Development of Specialty Cellulose Fibers and Cementitious Matrices for Cellulose Fiber Reinforced Cement Composites*, Abstract.

* cited by examiner

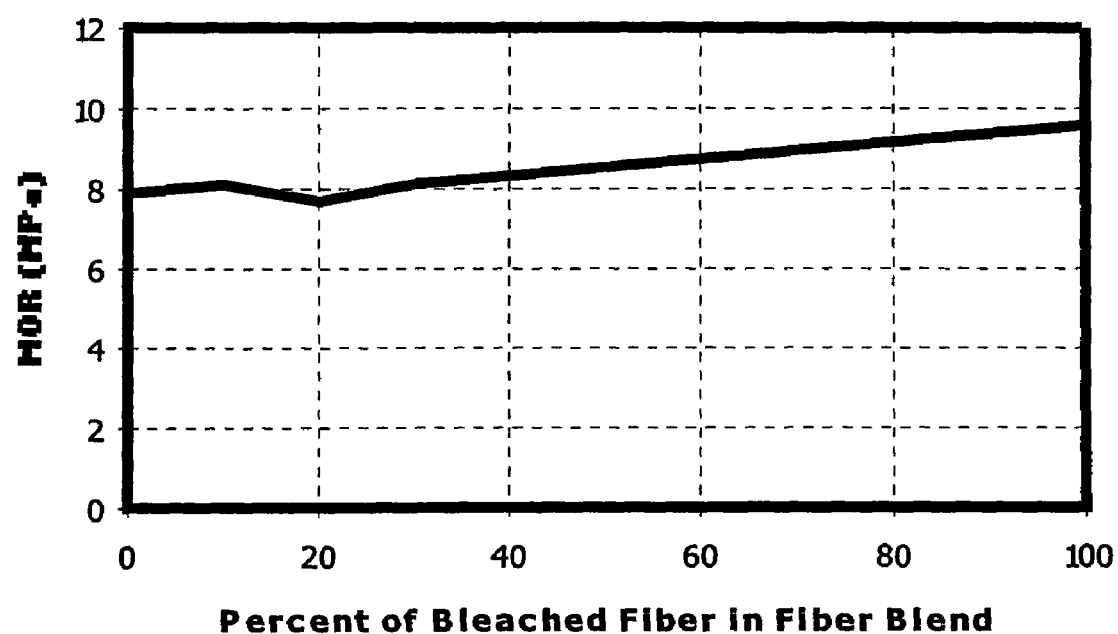
Figure 2: MOR of Fiber-Cement Composite Specimens Made with Varying Doses of Bleached Kraft Fibers in Fiber Blends

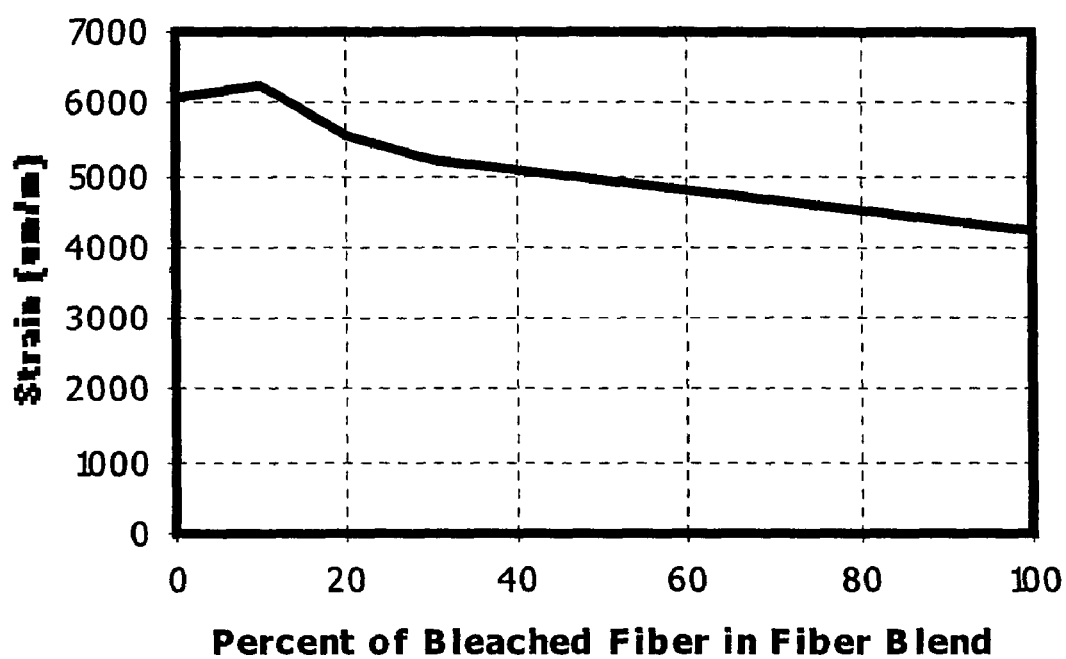
Figure 3: Strain of Fiber-Cement Composite Specimens Made with Varying Doses of Bleached Kraft Fibers in Fiber Blends

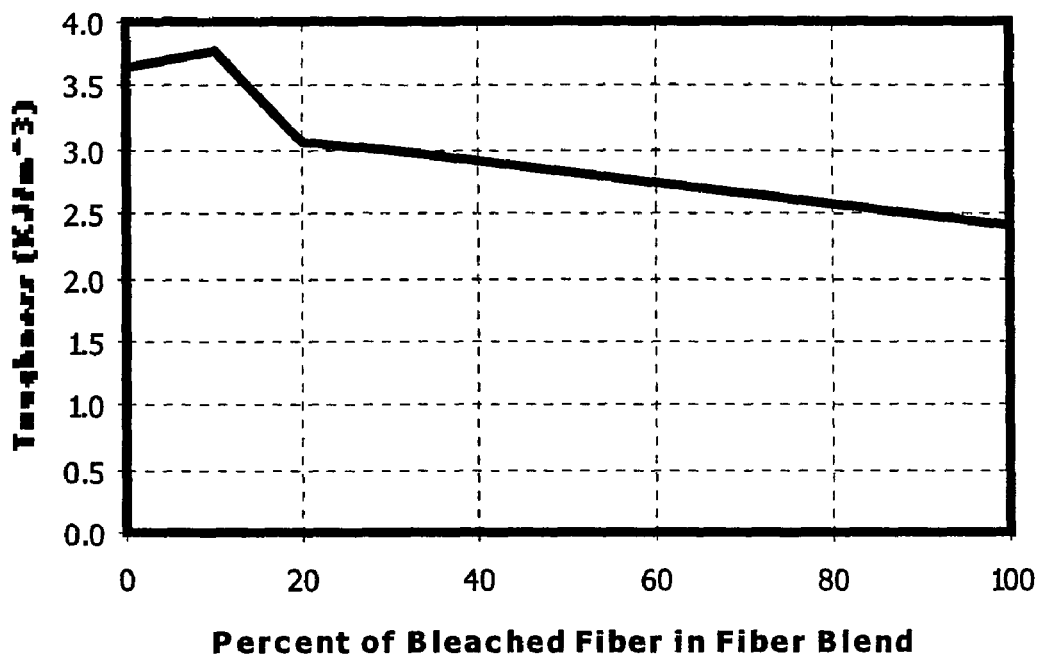
Figure 4: Toughness of Fiber-Cement Composite Specimens Made with Varying Doses of Bleached Kraft Fibers in Fiber Blends

FIBER CEMENT COMPOSITE MATERIALS USING BLEACHED CELLULOSE FIBERS

RELATED APPLICATIONS

This application claims the benefit of U.S. Provisional Application No. 60/439,040, filed Jan. 9, 2003, the entirety of which is hereby incorporated by reference.

BACKGROUND OF THE INVENTION

1. Field of the Invention

This invention relates generally to a fiber-reinforced composite material, and more particularly to a fiber cement building material utilizing a blend of bleached and unbleached cellulose fibers as reinforcing fibers, including formulations, methods of manufacture, and final products.

2. Description of the Related Art

Fiber-reinforced composite materials have been used to form various building products such as building sheets, panels, planks and roofing material. The reinforcement fibers used in these building products typically include natural and synthetic fibers such as metal fibers, glass fibers, asbestos fibers, and cellulose fibers such as those described in Australian Patent No. 515151 and U.S. Pat. No. 6,030,447, which are hereby incorporated by reference in their entirety. Presently, cellulose fiber is one of the preferred fibers for most commercial building material applications because it is an effective, low cost, and recyclable natural product that is compatible with most conventional fiber cement manufacturing processes such as refining and autoclaving.

The performance characteristics of most cellulose fiber reinforced building materials are highly dependent on the quality and characteristic of the cellulose fibers used. In particular, the species and grade of cellulose fibers can have a significant impact on the flexibility and strength of the building material. For example, unbleached, premium grade cellulose fibers derived from *Pinus Radiata* are known to provide the resulting product with higher strength because these fibers typically have longer length and favorable strength-related properties. Conversely, unbleached, standard grade cellulose fibers derived from a variety of other commonly available wood species such as Douglas fir, hemlock, spruce, white fir, southern pine, and redwood are generally shorter and/or weaker, imparting lower strength and flexibility to the product.

However, there are several disadvantages associated with the use of premium grade cellulose fibers. First, the source of premium grade cellulose pulp has been largely limited to one particular species of wood. The cost of such fibers is also significantly higher than other grades of unbleached pulp. Moreover, limited availability of premium grade pulp can place severe constraints on fiber cement manufacturing operations and ultimately drive up the cost of the product. As such, product manufacturers typically incorporate both premium grade and standard grade unbleached pulps in fiber-cement composite materials in order to provide a final product with adequate strength and flexibility at minimum cost.

Even so, unbleached standard grade Kraft pulps typically used for fiber cement are considered specialty grades of cellulose pulp and are sold at a premium price over other types of cellulose pulp commonly used in paper, linerboard or other cellulose pulp based products.

Hence from the foregoing, it will be appreciated that there is a need for a readily available, less costly substitute for premium grade cellulose fibers for use in the manufacturing of fiber cement composite materials. To this end, there is a particular need for a cellulose fiber that will provide fiber cement composite materials with substantially equal if not improved strength, flexibility and other physical properties as compared to equivalent composite materials reinforced with premium grade cellulose fibers.

SUMMARY OF THE INVENTION

The aforementioned needs are satisfied by the preferred embodiments of the present invention, which in certain embodiments disclose the novel concept of using a blend of bleached and unbleached standard grade cellulose fibers as a partial or complete substitute for premium grade cellulose fibers in the manufacture of fiber cement reinforced composite materials.

The terms "bleached cellulose fibers," "bleached fibers" and "bleached cellulose pulp" used herein refer to cellulose fibers that have been treated with a bleaching agent such as hydrogen peroxide, sodium hypochlorite, chlorine, and/or chlorine dioxide. The bleached cellulose fibers may encompass pulp derived from a variety of species of wood including but not limited to Douglas fir, hemlock, *P. Radiata* pine, white fir, spruce, southern yellow pine, kenaf, and redwood. The bleached cellulose fibers can be prepared by Kraft, Sulfite, or other pulping methods.

The terms "premium grade cellulose fibers," "premium grade fibers" and "premium grade cellulose pulp" used herein refer to cellulose fibers derived from *P. Radiata* pines having an average fiber length of more than about 1.5 mm and an average tensile strength of more than about 12.5 km by TAPPI method T231. The terms "standard grade cellulose fibers," "standard grade fibers" and "standard grade cellulose pulp" used herein refer to cellulose fibers derived from a variety of commonly available wood species such as Douglas fir, hemlock, spruce, white fir, southern pine, kenaf, and redwood, excluding *P. Radiata* pines. The term "standard grade cellulose fibers" can also be used to refer to "fiber cement grade" cellulose fibers known in the art.

In one aspect, the preferred embodiments of the present invention provide a composite material comprising a cementitious matrix and cellulose fibers incorporated into the cementitious matrix, wherein the cellulose fibers comprise a blend of bleached and unbleached cellulose fibers. In one embodiment, the bleached cellulose fibers comprise less than about 50%, preferably between about 5%-25%, of the total cellulose fibers incorporated into the matrix. In another embodiment, the bleached cellulose fibers have a Kappa number of less than or equal to about 10.

The bleached cellulose fibers are preferably standard grade fibers derived from species selected from the group consisting of Douglas fir, hemlock, spruce, southern pines, and redwood. In certain embodiments, the bleached cellulose fibers can also be premium grade fibers derived from *P. Radiata* pine. The unbleached cellulose fibers are preferably standard grade fibers comprising species selected from the group consisting of Douglas fir, hemlock, white fir, spruce, southern pine and redwood. In one embodiment, the bleached and unbleached cellulose fibers combined comprise about 0.5%-20% by weight of the composite material. In another embodiment, the bleached and unbleached cellulose fibers comprise standard grade cellulose fibers having an average fiber length of between about 1 mm to 3.5 mm. Preferably, the modulus of rupture (MOR) and toughness energy of the composite material reinforced with the blend of bleached and unbleached fibers are substantially equal to or greater than that of an equivalent material reinforced with unbleached, premium grade cellulose fibers.

In another aspect, the preferred embodiments of the present invention provide a method of manufacturing a fiber-reinforced cement composite material. The method comprises providing bleached and unbleached cellulose fibers; mixing the bleached and unbleached cellulose fibers with a cementitious binder to form a fiber cement mixture; forming the fiber cement mixture into a fiber cement article of a pre-selected shape and size; and curing the fiber cement article. In one embodiment, the step of providing the bleached cellulose fibers comprises treating standard grade cellulose fibers with a bleaching agent. Preferably, the bleached cellulose fibers have an average Kappa number of less than or equal to about 10. In another embodiment, providing the unbleached cellulose fibers comprises providing unbleached, standard grade cellulose fibers. Preferably, the bleached and unbleached cellulose fibers are mixed in pre-selected proportions to provide the composite material with pre-determined physical properties. In one embodiment, the pre-selected proportion is formulated to provide the composite material with a modulus of rupture (MOR) that is substantially equal to or greater than the MOR of an equivalent composite material reinforced with only premium grade cellulose fibers.

In yet another aspect, the preferred embodiments of the present invention provide a composite building material comprising a cementitious matrix and a blend of cellulose fibers. Preferably, the blend of cellulose fibers comprises bleached and unbleached cellulose fibers and is selected to provide the building material with pre-determined flexibility and strength. In one embodiment, the blend of cellulose fibers is selected to provide the building material with flexibility and tensile strength that are substantially equal or superior to that of an equivalent building material reinforced with only premium-grade cellulose fibers. In another embodiment, the blend of cellulose fibers is selected to provide the building material with flexibility and tensile strength that are substantially equal or superior to the flexibility and strength of an equivalent building material reinforced with only bleached cellulose fibers. Preferably, the blend of cellulose fibers comprises less than about 50%, more preferably between about 5%-25%, bleached cellulose fibers. Moreover, the blend of cellulose fibers preferably does not include premium grade cellulose fibers.

In yet another aspect, the preferred embodiments of the present invention provide a composite material comprising a cementitious matrix, a first portion of cellulose fibers having a Kappa number of less than or equal to about 10 and a second portion of standard grade cellulose fibers having a Kappa number of greater than about 10. In one embodiment, the first portion of cellulose fibers comprises premium grade cellulose fibers. In another embodiment, the first portion of the cellulose fibers comprises less than about 50% by weight of the total amount of the two portions of the cellulose fibers combined. Advantageously, the bleached, standard grade cellulose fibers combine synergistically with the unbleached, standard grade fibers in the cementitious matrix, resulting in a composite material with substantially equal or improved strength and flexibility when compared with equivalent composite materials formed with only premium grade cellulose fibers.

BRIEF DESCRIPTION OF THE DRAWINGS

FIG. 2 illustrates the relationship between the modulus of rupture (MOR) of a fiber-cement composite material and varying amounts of bleached fibers incorporated in the material;

FIG. 3 illustrates the relationship between strain of the fiber-cement composite material and varying amounts of bleached fibers incorporated in the material;

FIG. 4 illustrates the relationship between toughness of the fiber-cement composite material and varying amounts of bleached fibers incorporated in the material.

DETAILED DESCRIPTION OF THE PREFERRED EMBODIMENT

Figure 1:
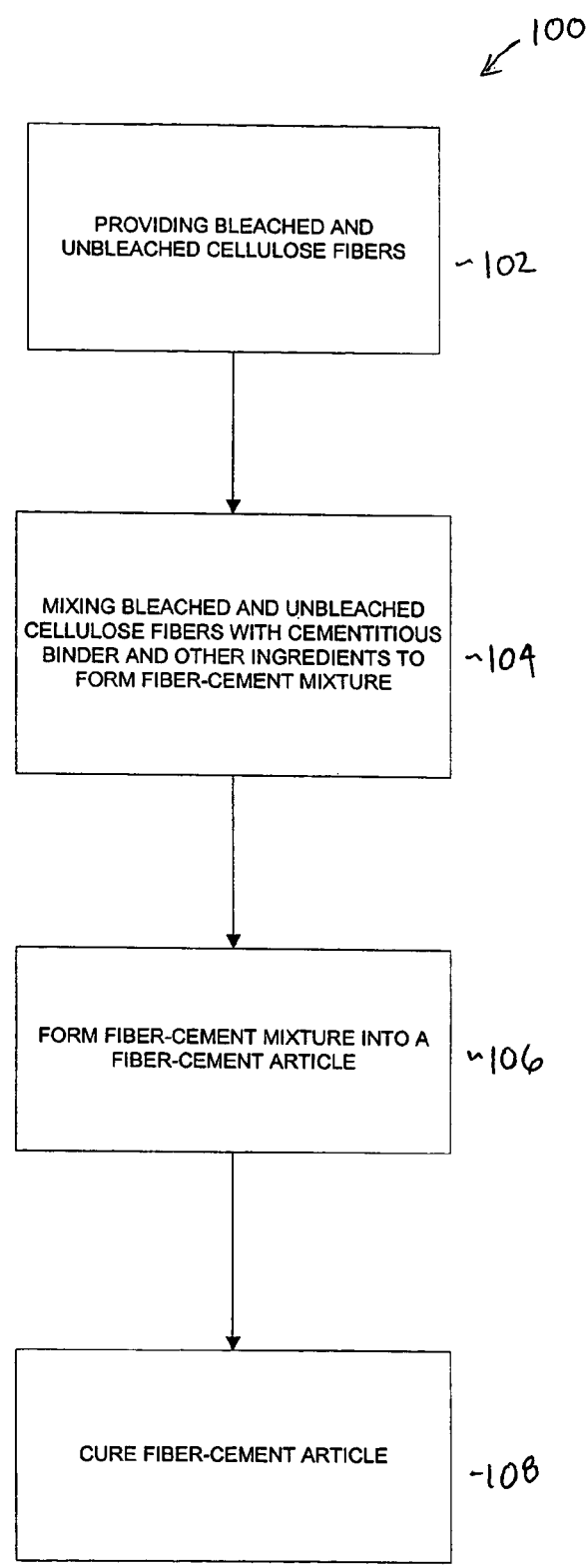
FIG. 1 illustrates the process flow of a preferred method of forming a fiber cement composite material reinforced with a blend of bleached and unbleached cellulose fibers.

Certain preferred embodiments of the present invention describe the use of a blend of bleached and unbleached cellulose fibers as reinforcement fibers in cementitious composite materials. In some preferred embodiments, the bleached and unbleached fibers are both standard grade fibers that in combination can serve as a partial or complete substitute for the more expensive and less abundant premium grade cellulose fibers. These embodiments encompass not only the composite materials formed with the blend of bleached and unbleached fibers, but also the formulation and methods of manufacture of the composite materials.

Bleached cellulose fibers have been used almost exclusively in the paper-making industry to provide white papers and paperboards. It is also widely recognized that the bleaching process degrades the fiber structure and weakens its reinforcing capabilities, making bleached fibers undesirable for fiber cement composite material applications. Such belief has been well documented in various technical publications. For example, in U.S. Pat. No. 4,985,119 entitled "CELLULOSE FIBER-REINFORCED STRUCTURE", it indicates that "such bleaching [of the fibers] is not preferred due to cost and fiber degradation." Accordingly, it is against conventional wisdom to use bleached fibers as a reinforcing fiber for fiber cement composite materials because bleached fibers are generally believed to produce a fiber cement product that is weaker and more brittle.

However, contrary to conventional wisdom, Applicant has found that bleached cellulose fibers when used in proper proportions with unbleached, standard grade cellulose fibers can result in a fiber cement composite material with substantially equal or even superior flexibility, strength, and other physical properties when compared to an equivalent composite material reinforced by the more costly and less abundant premium grade cellulose fibers. It has been surprisingly found that proper blends of the selected bleached fibers and unbleached standard grade pulp give the final product a good balance of strength and flexibility.

Without wishing to be bound by a specific theory, Applicant believes that the bleached cellulose fibers have reduced lignin content and increased number of reactive sites on the fiber surface as compared with equivalent cellulose fibers not treated with a bleaching agent. Applicant believes that this allows improved bonding of the fibers with the cementitious matrix and helps overcome the shorter fiber length and fiber brittleness normally associated with standard grade cellulose pulps. When used in predetermined amounts that complement the properties of unbleached pulp, Applicant has surprisingly found that bleached cellulose pulps are indeed very effective reinforcement fibers for cement composites.

One embodiment of the present invention provides a fiber cement composite material that incorporates bleached cellulose fibers in combination with unbleached standard grade cellulose fibers as reinforcing fibers. In one embodiment, the individual fiber length is between about 1 mm to 3.5 mm. Preferably, the bleached and unbleached fibers are used as a partial or complete substitute for the premium grade cellulose fibers that are commonly used in most fiber cement composite materials. The bleached cellulose fibers are preferably fibers treated with a bleaching agent such as hydrogen peroxide, sodium hypochlorite, or the like to reduce the lignin content of the fibers to a Kappa number of less than or equal to about 10. In one embodiment, the bleached fibers can comprise standard grade cellulose pulp of species including but not limited to Douglas fir, hemlock, white fir, spruce, kenaf, southern pines and redwood. Moreover, it will be appreciated that the preferred embodiments of the present invention are not limited to the use of bleached cellulose fibers as a substitute for premium grade fibers, but also include the use of all chemically treated fibers with substantially reduced lignin content and increased number of reaction sites on the fiber surface. Without wishing to be bound by theory, it is believed that the exposed reaction sites will increase the number of fiber-to-fiber and fiber-to-cement bonding in the matrix, which in turn imparts strength to the material comparable to that achieved by stronger fibers.

In one embodiment, the bleached cellulose fibers are incorporated in a fiber cement matrix in combination with unbleached, standard grade pulp. The bleached fibers preferably comprise less than about 50%, more preferably between about 5%-25%, of the total cellulose fibers incorporated into the matrix. The combination of bleached cellulose fibers and unbleached standard grade cellulose pulp can be used in a variety of composite materials all having different proportions of cementitious binder, aggregate, and cellulose fibers.

Most of the embodiments described herein can be encompassed by the following formulation:
- about 10%-80% cementitious binder (which, in certain embodiments, is selected from the group consisting of high alumina cement, lime, high phosphate cement, ground granulated blast furnace slag cement, and mixtures thereof);
- about 20%-80% aggregate (which, in certain embodiments, is selected from group consisting of ground silica, amorphous silica, micro silica, geothermal silica, diatomaceous earth, coal combustion fly ash, blast furnace slag, granulated slag, steel slag, mineral oxides, mineral hydroxides, clays, magnasite or dolomite, metal oxides and hydroxide, polymeric beads, and mixtures thereof);
- about 0.5%-20% cellulose fibers as comprising a combination of bleached standard grade cellulose fibers and unbleached standard grade cellulose fibers, and/or natural inorganic fibers, and/or synthetic fibers, wherein less than about 50% of the total cellulose fibers is bleached fibers;
- about 0%-80% density modifiers (which, in certain embodiments, is selected from the group consisting of plastic materials, expanded polystyrene or other foamed polymer materials, glass and ceramic materials, calcium silicate hydrates, microspheres and volcano ashes including perlite, pumice, shirasu basalt, zeolites in expanded forms, and mixtures thereof); and
- about 0%-10% additives (which, in certain embodiments, is selected from the group consisting of viscosity modifiers, fire retardants, waterproofing agents, silica fume, geothermal silica, thickeners, pigments, colorants, plasticizers, dispersants, forming agents, flocculent, drainage aids, wet and dry strength aids, silicone materials, aluminum powder, clay, kaolin, alumina trihydrate, mica, metakaolin, calcium carbonate, wollastonite, polymeric resin emulsion, and mixtures thereof).

FIG. 1 provides a schematic illustration of a process flow 100 of manufacturing a fiber cement composite material of one embodiment of the present invention. As shown in FIG. 1, the process 100 begins with Step 102, which comprises providing bleached and unbleached standard grade cellulose fibers. In one embodiment, the bleached cellulose fibers are less than about 50% of the combined weight of the bleached and unbleached fibers. In another embodiment, Step 102 comprises treating standard grade cellulose fibers with a bleaching agent to form bleached fibers having a Kappa number of less than about 10. The process 100 continues with Step 104, which comprises mixing the bleached and unbleached cellulose fibers with a cementitious binder and other ingredients to form a fiber cement mixture. Subsequently, the fiber cement mixture is formed into a fiber cement article of a pre-selected shape and size in Step 106. The fiber cement article is then cured to form the fiber cement reinforced composite building material in Step 108.

The advantages of incorporating a blend of bleached and unbleached standard grade cellulose fibers in a fiber cement composite matrix are numerous. They include the following:
- resulting composite material achieves a desired balance of strength and flexibility that is normally achievable only through incorporation of premium grade cellulose fibers;
- resulting composite material utilizes bleached cellulose fibers that can be obtained from a variety of commonly available wood species including but not limited to Douglas fir, hemlock, spruce, and redwood;
- bleached fibers require less energy to refine, reducing the product cost of the resulting composite material;

Example 1

Table 1 compares the mechanical properties of the fiber-reinforced cement composite materials made with equivalent formulations in which Formulation A incorporates bleached cellulose fibers and Formulation B incorporates premium cellulose fibers. The materials were produced using a Hatschek machine and the results are based on many samples collected over 1 week of production. It can be seen that formulations containing about 13% bleached pulp resulted in products with similar mechanical properties as compared with products based on an equivalent formulation containing about 13% premium fiber of *P. Radiata* pine.

TABLE 1

Property Comparisons

| | Formulations | |
|---|---|---|
| Averaged Physical Properties | A<br>13% bleached pulp | B<br>13% premium *Radiata* pine |
| MOR (MPa) | 10.39 | 10.29 |
| Dry Density (Kg/m$^3$) | 1.25 | 1.25 |
| Strain (μm/m) | 12444 | 11961 |
| Toughness (KJ/m$^3$) | 10.39 | 10.99 |

The base formulation for A and B is: about 35% Portland cement, about 57% ground silica and about 8% cellulose pulp. About 13% of the Formulation A cellulose pulp is bleached pulp and about 13% of the Formulation B cellulose pulp is *Radiata* pine. The remainder of the pulp for both formulations is standard grade Douglas fir Kraft pulp. Mechanical properties such as the modulus of rupture (MOR), strain, and toughness, are tested by three-point bending under the wet condition in accordance with ASTM (American Standard Test Method) C1185-98a entitled "Standard Test Methods for Sampling and Testing Non-Asbestos Fiber-Cement Flat Sheet, Roofing and Siding Shingles, and Clapboards."

Example 2

Specimens of fiber cement composite materials were made in accordance with Formulations C and D as shown in Table 2 below. Formulation C incorporated a blend of bleached and unbleached cellulose fibers. The fiber blend contained about 20% bleached fibers and about 80% unbleached fibers. Formulation D was the control, which utilized all unbleached fibers. It will be appreciated that the fiber cement formulations were selected for comparison purposes only and that a variety of other formulations can be used without departing from the scope of the present invention.

The oven dry densities of the specimens made in accordance with Formulations C and D were each about 1.25 g/cm$^3$. The bleached fibers were Kraft pulp from Douglas fir with brightness of about 88, a Kappa number of 0 to 1 by TAPPI method T236 and an average fiber length of about 2.4 mm. The unbleached fibers were conventional standard grade cellulose fibers with an average fiber length of about 2.6 mm and a Kappa number of 26. Both the bleached and unbleached fibers were refined to about 450 CSF (Canadian Standard Freeness) measured by TAPPI method T227.

TABLE 2

Formulations for Table 3 Test Results

| Formulation Identification | Hydraulic Binder Portland Cement | Aggregate Silica | Fiber Bleached Fiber | Fiber Unbleached Fiber |
|---|---|---|---|---|
| C | 35% | 57% | 1.6% | 6.4% |
| D | 35% | 57% | 0.0% | 8.0% |

Table 3 below provides an illustrative comparison of various mechanical and physical properties of fiber cement specimens made in accordance with formulations that incorporate a blend of bleached and unbleached cellulose fibers (Formulation C) and those that use conventional, unbleached cellulose fibers (Formulation D). The modulus of rupture (MOR), strain, and toughness are tested by three-point bending under the wet condition in accordance with ASTM (American Standard Test Method) C1185-98a entitled "Standard Test Methods for Sampling and Testing Non-Asbestos Fiber-Cement Flat Sheet, Roofing and Siding Shingles, and Clapboards."

TABLE 3

Property Comparison of Fiber Reinforced Cement Composite Materials With and Without Bleached Cellulose Fibers

| Physical Properties | Formulations | |
|---|---|---|
| | C (with 20% bleached fiber) | D (no bleached fiber) |
| MOR (MPa) | 11.23 | 11.09 |
| Dry Density (Kg/m$^3$) | 1.25 | 1.25 |
| Strain (μm/m) | 13491 | 14292 |
| Toughness (KJ/m$^3$) | 19.26 | 20.62 |

As shown in Table 3, key mechanical properties such as modulus of rupture (MOR) and ultimate strain are generally the same or slightly higher for specimens made with a blend of the bleached and unbleached fibers in accordance with Formulations C when compared to specimens made in accordance with Formulation D, the control formulation without bleached fibers. An equivalent formulation is herein defined as one in which the weight of unbleached cellulose fibers are displaced by an equivalent weight of bleached cellulose fibers. It will be appreciated that these are exemplifying results. By varying the proportional composition of bleached fibers, it will be appreciated that the physical and mechanical properties, such as MOR and strain, etc., of the final products can be changed to meet specific application needs.

FIGS. 2 to 4 illustrate the relationship between certain mechanical properties (MOR, strain and toughness) of the fiber-cement products and the percentage of bleached fibers in a fiber blend. It can be seen that percentage of bleached fibers is important for the fiber-cement composite materials to have a balanced properties of MOR, strain and toughness. Excessive bleached fibers present in the blend can adversely affect certain properties. For example, MOR will increase but the strain and toughness will decrease as the percentage of bleached fibers increases. In certain embodiments, to ensure good MOR as well as good strain and toughness, maximum proportions of bleached fibers shall not exceed 40% of the total fibers as shown in FIGS. 2 to 4.

Although the foregoing description of the preferred embodiments of the present invention has shown, described and pointed out the fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the invention should not be limited to the foregoing discussions, but should be defined by the claims presented in the subsequently filed utility patent application.

What is claimed is:

1. A composite material, comprising:
    a cementitious matrix; and
    cellulose fibers incorporated into the cementitious matrix, wherein the cellulose fibers comprise a blend of bleached and unbleached cellulose fibers and wherein the bleached cellulose fibers comprise between about 10 and 17 weight percent of the total cellulose fibers incorporated into the matrix.

2. The composite material of claim 1, wherein the bleached cellulose fibers have an average Kappa number of less than or equal to about 10.

3. The composite material of claim 1, wherein the bleached cellulose fibers comprise fibers from species selected from the group consisting of Douglas fir, hemlock, spruce, southern yellow pines, kenaf and redwood.

4. The composite material of claim 1, wherein the bleached cellulose fibers comprise fibers of *P. Radiata* pine.

5. The composite material of claim 1, wherein the unbleached cellulose fibers comprise fibers from species selected from the group consisting of Douglass fir, hemlock, white fir, spruce, southern pine, kenaf and redwood.

6. The composite material of claim 1, wherein the bleached and unbleached cellulose fibers comprise about 0.5%-20% by weight of the composite material.

7. The composite material of claim 1, wherein the bleached and unbleached cellulose fibers comprise cellulose fibers having an average fiber length of between about 1 mm to 3.5 mm.

8. The composite material of claim 1, wherein the toughness energy of the composite material is substantially equal to or greater than the toughness energy of an equivalent composite material reinforced with unbleached, premium grade cellulose fibers.

9. A composite material, comprising:
a cementitious matrix; and
cellulose fibers incorporated into the cementitious matrix, wherein the cellulose fibers comprise a blend of bleached and unbleached cellulose fibers and wherein the bleached cellulose fibers comprise between about 10 and 14 weight percent of the total cellulose fibers incorporated into the matrix, wherein the modulus of rupture of the composite material is greater than about 8 MPa.

10. A composite material, consisting essentially of:
10% to 80% weight percent cementitious binder selected from the group consisting of high alumina cement, lime, high phosphate cement, ground granulated blast surface slag cement, and mixtures thereof;
20% to 80% weight percent aggregate selected from the group consisting of ground silica, amorphous silica, micro silica, geothermal silica, diatomaceous earth, coal combustion fly ash, blast furnace slag, granulated slag, steel slag, mineral oxides, mineral hydroxides, clays, magnasite or dolomite, metal oxides and hydroxide, polymeric beads, and mixtures thereof;
0%-80% density modifiers selected from the group consisting of plastic materials, expanded polystyrene or other foamed polymer materials, glass and ceramic materials, microspheres and volcano ashes including perlite, pumice, shirasu basalt, zeolites in expanded forms, and mixtures thereof;
0%-10% additives selected from the group consisting of viscosity modifiers, fire retardants, waterproofing agents, silica fume, geothermal silica, thickeners, pigments, colorants, plasticizers, dispersants, forming agents, flocculent, drainage aids, wet and dry strength aids, silicone materials, aluminum powder, clay, kaolin, alumina trihydrate, mica, metakaolin, calcium carbonate, wollastonite, polymeric resin emulsion, and mixtures thereof; and
cellulose fibers incorporated into the cementitious matrix comprising the cementitious binder and aggregate, wherein the cellulose fibers comprise a blend of bleached and unbleached cellulose fibers and wherein the bleached cellulose fibers comprise between about 10 and 17 weight percent of the total cellulose fibers incorporated into the matrix.

11. The composite material of claim 10, wherein the bleached fibers comprise between 12 and 14 weight percent of the total cellulose fibers incorporated into the matrix.

12. The composite material of claim 10, wherein the cementitious binder is between 30 and 40 weight percent Portland cement and the aggregate consists essentially of 50 to 60 weight percent ground silica.

13. The composite material of claim 1, wherein the modulus of rupture (MOR) of the composite material is substantially equal to or greater than the MOR of an equivalent composite material reinforced with unbleached, premium grade cellulose fibers.

14. The composite material of claim 10, wherein the bleached fibers comprise about 15 weight percent of the total cellulose fibers incorporated into the matrix.

* * * * *